United States Patent Office 3,234,267
Patented Feb. 8, 1966

3,234,267
PREPARATION OF FLUOROCARBON NITRILES
James W. Vogh, Lake Jackson, Tex., assignor to The Dow Chemical Company, Midland, Mich., a corporation of Delaware
No Drawing. Filed June 13, 1962, Ser. No. 202,065
12 Claims. (Cl. 260—465.7)

This invention relates to an improved method for the preparation of fluoronitriles.

Heretofore, fluoronitriles, i.e., fluorocarbon nitriles, have been prepared (1) by the conversion of a fluorocarbon carboxylic acid to the amide, through the route of forming either the ester or acyl halide, followed by a subsequent dehydration, using $P_2O_5$, to the nitrile or (2) by the reaction of cyanogen chloride and a difluoromethane. One of the disadvantages of the first method is that nitriles cannot be prepared for the compounds for which there are no corresponding fluorocarbon carboxylic acids, or that the route is undesirable where the carboxylic acids are difficult to prepare. The second method suffers from the disadvantage that it must be carried out at a rather elevated temperature, viz., 600–650° C. Such a temperature is not as conveniently used as lower temperatures, and, in addition, some of the desired compounds are not entirely stable in that temperature range.

It is, therefore, a principal object of the present invention to provide a method of preparing fluoronitriles for which there are no corresponding carboxylic acids or where these acids are difficult to prepare.

Another object of the invention is to provide a method of preparing fluoronitriles at a lower reaction temperature.

Still another object of the present invention is to provide a method of preparing fluoronitriles by a simpler reaction involving merely the displacement of an iodine, thus minimizing the possibility of mixed reaction products.

These and other objects and advantages of the present invention will be more apparent upon becoming familiar with the following specification and the appended claims.

The improved method of the present invention is based on the discosery that upon reacting a fluorocarbon iodide with a CN group-containing-compound selected from the group consisting of cyanogen, cyanogen iodide, metal cyanides and metal ferricyanides and other non-hydrocarbon compounds capable of releasing cyanogen on being heated, and mixtures thereof, at an elevated temperature and at an autogenous pressure of at least 20 atmospheres, the corresponding fluorocarbon nitrile is formed by a direct substitution of a CN group for the iodine in the molecule.

The fluorocarbon iodides used in the present invention are saturated aliphatic compounds typified by those formed (1) by the addition of a fluorocarbon iodide to a fluoro-olefin or (2) by the addition of iodine monochloride to a fluoro-olefin.

Generally, perfluorocarbon iodides having more than about six carbon atoms per molecule become progressively much more difficult to prepare by present methods, as the number of carbon atoms is increased. However, for the purposes of the method of the invention, there is no chemical limitation as to the number of carbon atoms in, or the molecular weight of, suitable fluorocarbon iodides, and the method should not be limited to the use of presently available compounds.

Suitable fluorocarbon iodides include the perfluorocarbon iodides as well as perhalocarbon iodides in which either chlorine or bromine are substituted for part of the fluorine in the perfluorocarbon radical. Substitution is generally with chlorine. There should be at least one fluorine atom attached to each carbon atom.

The fluorocarbon iodides used in the present method may also have more than one iodine atom in the molecule in order that dinitrilo, trinitrilo or tetranitrilo, as well as mononitrilo compounds may be prepared. Monoiodides or diiodides are more usually employed. To avoid decomposition by the splitting off of $I_2$, or other side reactions, plural iodine substitution, if any, should not be on the same carbon atom and preferably, not on adjacent carbon atoms in the fluorocarbon iodide molecule. In general, iodine in the primary position, i.e., on a primary carbon, is displaced more readily, although iodine in the secondary and tertiary positions may also be replaced by the CN group.

CN group-containing-compounds which may be employed include cyanogen and cyanogen iodide, as well as the cyanides of heavy metals, transition metals and the alkaline earth metals. Also usable are the complex cyanides such as the alkali metal ferricyanides. Any CN group-containing non-hydrocarbon material may be used which yields CN on being heated, although it is not necessary that cyanogen per se is present during the reaction. The more preferred CN group-containing-compounds include cyanogen, cyanogen iodide and the ferricyanides. The most preferred CN group-containing-compounds are cyanogen and cyanogen iodide.

The reaction of the present invention is carried out in a closed vessel such as a sealed glass ampule or a metal bomb or other suitable pressure vessel adapted for accommodating the present reactants at pressures above 20–200 atmospheres or more. The selected fluorocarbon iodide and a CN group-containing-material are placed in the vessel in the requisite amounts calculated to bring the contents to an autogenous pressure of at least 20 atmospheres at reaction temperature, and more preferably, to a pressure of at least 50 atmospheres. Yields appear to increase with increased autogenous pressures employed.

While stoichiometric amounts of the reactants may be used, yields of fluoronitrile product are generally improved by the use of an excess of 25 percent or more of the CN group-containing-material, based on the stoichiometric amount.

Reaction is generally initiated and proceeds at reasonable rates at temperatures of 300° C. or more. Usually reaction times of 30 minutes to 2 hours are adequate. It is preferred to maintain the reaction temperature in the range of about 350 to 400° C. in order to obtain higher autogenous pressures and faster reaction rates. At temperatures somewhat above 400° C., there is some tendency for nitriles to form triazine derivatives, while at temperatures above about 500° C., cyanogen tends to polymerize to paracyanogen.

The present invention may be further illustrated, but is not to be construed as limited, by the following examples.

*Example 1*

In each of three concurrent tests, equimolar amounts of 1-iodoperfluoropropane and cyanogen were sealed in a glass ampule in the requisite amount calculated to provide pressures, variously, of from 58 to 136 atmospheres. The ampules and contents were brought to a temperature of 350° C. and maintained at temperature for one hour. After the reaction mixtures had been allowed to cool to room temperature, they were analyzed by infrared spectroscopy. The calculated initial pressure, the percent conversion of C₃F₇I and the loss of cyanogen over and above that consumed in the reaction, are shown in the accompanying table.

| Run | 1 | 2 | 3 |
|---|---|---|---|
| Calculated total pressure, atm | 58 | 92 | 136 |
| Percent Conversion of $C_3F_7I$ | 12 | 25 | 39 |
| Excess loss $(CN)_2$, percent | 39 | 21 | 0 |

NOTE.—Excess loss=total $(CN)_2$ consumed less $(CN)_2$ accounted for by reaction with $C_3F_7I$.

The following fluorocarbon iodides may be used to prepare the corresponding fluorocarbon nitriles according to the method of Example 1:

$CF_2ClI$             $CF_3—CFI—CF_3$
$CF_2BrI$             $CF_2Cl—CFI—CF_3$
$CF_3—CF_2I$          $CF_2Br—CFI—CF_3$
$CF_3—CFClI$          $CF_3—CF_2—CFClI$
$CF_3—CFBrI$          $CF_3—CFCl—CF_2I$
$CF_2Br—CF_2I$        $CF_3—CFBr—CF_2I$
$CF_2Br—CFBrI$        $CF_2Cl—CFCl—CF_2I$ $CF_3—CF_2—CF_2—CF_2I$
$CF_3—CF_2—CFCl—CF_2I$
$CF_3—CF_2—CF_2—CFClI$
$CF_3—CF_2—CF_2—CF_2—CF_2I$
$CF_3—CF_2—CF_2—CF_2—CF_2—CF_2I$

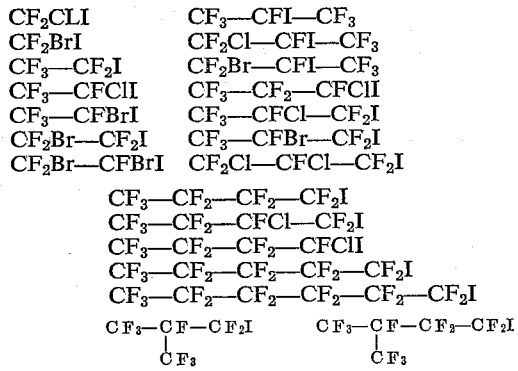

Example 2

Equimolar amounts of 1-iodoperfluoropropane and cyanogen iodide were sealed in a glass tube and heated at 350° C. for one hour. The autogenous pressure was calculated to be in excess of 20 atmospheres. At the end of the reaction period, the cooled reaction products were examined by infrared spectroscopy. Perfluoro-n-butyronitrile was formed quantitatively on the basis of 1-iodoperfluoropropane consumed.

Example 3

Equimolar amounts of 1-iodoperfluoropropane and potassium ferricyanide were sealed in a glass tube and heated at 350° C. for one hour. The autogenous pressure was calculated to be in excess of 20 atmospheres. At the end of the reaction period, the cooled reaction products were examined by infrared spectroscopy. Perfluoro-n-butyronitrile was the major fluorocarbon product. Some perfluoro-n-hexane was present in the reaction mixture.

Example 4

In a series of tests, trifluoroiodomethane was reacted, respectively, with various CN group-containing-compounds. In each test, a portion of trifluoroiodomethane, along with an amount of CN group-containing-compound in excess of the stoichiometric amount, was placed in a glass ampule and sealed. The amount of reactants was calculated to produce a pressure in excess of 20 atmospheres at the reaction temperature. Temperatures of 350°, 375° and 400° C. were employed, respectively, with each combination of reactants. In the tests in which the CN group-containing nitrile was one of cyanogen, cyanogen iodide, silver cyanide, mercury cyanide and potassium ferricyanide, trifluoroacetonitrile was the major reaction product. In the tests in which the CN group-containing-compound was one of silver cyanide, mercury cyanide, potassium ferricyanide and potassium cyanide, perfluoroethane was present in the reaction product. In the test in which potassium cyanide was used, perfluoroethane was the major fluorocarbon product. While 375° C. proved to be a satisfactory reaction temperature at times of 45–120 minutes, satisfactory reactions were also obtained at 350° C. and 400° C.

Example 5

1,2-diiodoperfluoroethane was reacted with perfluoroethylene to form 1,4-diiodoperfluorobutane. The so-formed 1,4-diiodoperflfluorobutane was reacted with cyanogen iodide in a sealed glass tube at a temperature in the range of 325–350° C. and at a pressure in excess of 20 atmospheres. The resulting fluorocarbon product was 1,4-dinitriloperfluorobutane.

The following fluorocarbon diiodides may be used to prepare the corresponding fluorocarbon dinitriles according to the method of Example 5.

$CF_2I—CFCl—CF_2I$
$CF_2I—CFBr—CF_2I$
$CF_3—CF_2I—CF_2—CF_2I$
$CF_2I—CF_2—CF_2—CF_2I$
$CF_3—CF_2—CFI—CF_2—CF_2I$

A trinitrilo fluorocarbon may be prepared using the following triiodide compound according to the method of Example 5.

$CF_2I—CF_2—CFI—CF_2—CF_2I$

Example 6

Iodine monochloride was reacted with perfluoroethylene to form 1-chloro-2-iodoperfluoroethane. The resulting 1-chloro-2-iodoperfluoroethane was reacted with cyanogen iodide in a sealed glass tube at a temperature in the range of 325–350° C. and at a pressure in excess of 20 atmospheres. The fluorocarbon product consisted of 3-chloro-perfluoropropane nitrile.

Example 7

Equivalent amounts of cyanogen iodide (40 grams) and 1,2-dichloro, 1-iodoperfluoroethane (72 grams) were reacted in a sealed 170 milliliter glass ampule at 300° C. for 90 minutes. Infrared analysis of the reaction product indicated a 65 percent yield of 2,3-dichloroperfluoropropane nitrile on the basis of the amount of fluorocarbon iodide reactant employed.

Example 8

A quantity of 1,2-dichloro, 1-iodoperfluoroethane (40.5 grams) was reacted with an amount of cyanogen (5.25 grams) representing a 39 percent excess above the stoichiometric amount. The reaction was carried out in a 190 milliliter sealed glass ampulse at 315° C. for 90 minutes Analysis of the reaction products by infrared spectroscopy showed, on the basis of the amount of fluorocarbon reactant employed, a 34 percent yield of 2,3-dichloroperfluoropropane nitrile and a 32 percent yield of 1,2,3,4-tetrachloroperfluorobutane.

The fluoronitrile compounds formed according to the present method are useful as intermediates employed in the following types of reactions:

$R_fCN + \text{alkaline hydrolysis} \rightarrow R_fCOOH$
$R_fCN + ROH, H_2SO_4 \rightarrow R_fCOOR$
$R_fCN + H_2 \text{ or } LiAlH_4 \rightarrow R_fCH_2NH_2$ where $R_f$ = perfluorocarbon radical
$R$ = alkyl group The method of the invention having thus been disclosed, modifications thereof will become apparent to those skilled in the art, and the scope of the invention is to be considered limited only by the scope of the hereinafter appended claims.

I claim:

1. The method of preparing a fluoronitrile which comprises: mixing a saturated aliphatic perfluorocarbon iodide having from one to six carbon atoms and from one to four iodine atoms in the molecule, each iodine atom in the molecule being attached to a separate carbon atom whereby not more than one iodine atom is attached to any of the carbon atoms, with a CN group-containing compound selected from the group consisting of cyanogen, cyanogen iodide, metal cyanides and alkali metal ferricyanides capable of releasing CN on being heated, and mixtures thereof, said CN group-containing compound being present in an amount, relative to the saturated aliphatic perfluorocarbon iodide, ranging from about stoichiometric to about a 39 percent excess over stoichiometric, of CN group-containing compound;

and heating said mixture at an elevated temperature in the range of about 300 to 500° C., and at an autogenous pressure of at least 20 atmospheres thereby to cause reaction between the saturated aliphatic perfluorocarbon iodide and the CN group-containing compound.

2. The method as in claim 1 in which at least one chlorine atom has been substituted for a fluorine atom in the molecule of the saturated aliphatic perfluorocarbon iodide, but having at least one fluorine atom on each carbon atom in the molecule.

3. The method as in claim 1 in which at least one bromine atom has been substituted for a fluorine atom in the molecule of the saturated aliphatic perfluorocarbon iodide, but having at least one fluorine atom on each carbon atom in the molecule.

4. The method of preparing a fluoronitrile which comprises: mixing a saturated aliphatic perfluorocarbon iodide having from one to six carbon atoms and from one to four iodine atoms in the molecule, each iodine atom in the molecule being attached to a separate carbon atom whereby not more than one iodine atom is attached to any of the carbon atoms, with a CN group-containing compound selected from the group consisting of cyanogen, cyanogen iodide, metal cyanides and alkali metal ferricyanides capable of releasing CN on being heated, and mixtures thereof, said CN group-containing compound being present in an amount, relative to the saturated aliphatic perfluorocarbon iodide, ranging from about stoichiometric to about a 25 percent excess over stoichiometric, of CN group-containing compound;

and heating said mixture at an elevated temperature in the range of about 300 to 500° C., and at an autogenous pressure of at least 20 atmospheres thereby to cause reaction between the saturated aliphatic perfluorocarbon iodide and the CN group-containing compound.

5. The method of preparing a fluoronitrile which comprises: mixing a saturated aliphatic perfluorocarbon iodide having from one to six carbon atoms and from one to four iodine atoms in the molecule, each iodine atom in the molecule being attached to a separate carbon atom whereby not more than one iodine atom is attached to any of the carbon atoms, with a CN group-containing compound selected from the group consisting of cyanogen, cyanogen iodide, metal cyanides and alkali metal ferricyanides, capable of releasing CN on being heated, and mixtures thereof, said CN group-containing compound being present in an amount, relative to the saturated aliphatic perfluorocarbon iodide, ranging from about stoichiometric to about a 39 percent excess over stoichiometric, of CN group-containing compound;

and heating said mixture at an elevated temperature in the range of about 300 to 500° C., and at an autogenous pressure of at least 50 atmospheres thereby to cause reaction between the saturated aliphatic perfluorocarbon iodide and the CN group-containing compound.

6. The method of preparing a fluoronitrile which comprises: mixing a saturated aliphatic perfluorocarbon iodide having from one to six carbon atoms and from one to four iodine atoms in the molecule, each iodine atom in the molecule being attached to a separate carbon atom whereby not more than one iodine atom is attached to any of the carbon atoms, with cyanogen, said cyanogen being present in an amount, relative to the saturated aliphatic perfluorocarbon iodide, ranging from about stoichiometric to about a 39 percent excess over stoichiometric of cyanogen;

and heating the mixture at an elevated temperature in the range of about 300 to 500° C., and at an autogenous pressure of at least 20 atmospheres thereby to cause reaction between the saturated aliphatic perfluorocarbon iodide and the cyanogen.

7. The method of preparing a fluoronitrile which comprises: mixing a saturated aliphatic perfluorocarbon iodide having from one to six carbon atoms and from one to four iodine atom in the molecule, each iodine atom in the molecule being attached to a separate carbon atom whereby not more than one iodine atom is attached to any of the carbon atoms, with cyanogen iodide, said cyanogen iodide being present in an amount, relative to the saturated aliphatic perfluorocarbon iodide, ranging from about stoichiometric to about a 39 percent excess over stoichiometric of cyanogen iodide;

and heating the mixture at an elevated temperature in the range of about 300 to 500° C., and at an autogenous pressure of at least 20 atmospheres thereby to cause reaction between the saturated aliphatic perfluorocarbon iodide and the cyanogen iodide.

8. The method of preparing a fluoronitrile which comprises: mixing a saturated aliphatic perfluorocarbon monoiodide, having from one to six carbon atoms in which the iodine is connected to the molecule in a primary position, with a CN group-containing compound selected from the group consisting of cyanogen, cyanogen iodide, metal cyanides and alkali metal ferricyanides capable of releasing CN on being heated, and mixtures thereof, said CN group-containing compound being present in an amount, relative to the saturated aliphatic perfluorocarbon iodide, ranging from about stoichiometric to about a 39 percent excess over stoichiometric of CN group-containing compound;

and heating said mixture at an elevated temperature in the range of about 300 to 500° C., and at an autogenous pressure of at least 20 atmospheres thereby to cause reaction between the saturated aliphatic perfluorocarbon monoiodide and the CN group-containing compound.

9. The method of preparing a fluoronitrile which comprises: mixing a saturated aliphatic perfluorocarbon iodide having from one to six carbon atoms and from one to four iodine atoms in the molecule, each iodine atom in the molecule being attached to a separate carbon atom whereby not more than one iodine atom is attached to any of the carbon atoms, with a CN group-containing compound selected from the group consisting of cyanogen, cyanogen iodide, metal cyanides and alkali metal ferricyanides capable of releasing CN on being heated, and mixtures thereof, the amount of CN group-containing compound being from about 25 to about 39 percent in excess of the stoichiometric amount;

and heating said mixture at an elevated temperature in the range of about 300 to 500° C., and at an autogenous pressure of at least 20 atmospheres thereby to cause reaction between the saturated aliphatic perfluorocarbon iodide and the CN group-containing compound.

10. The method of preparing a fluoronitrile which comprises: mixing a saturated aliphatic perfluorocarbon iodide having from about one to six carbon atoms and from one to four iodine atoms in the molecule, each iodine atom in the molecule being attached to a separate carbon atom whereby not more than one iodine atom is attached to any of the carbon atoms, with a CN group-containing compound selected from the group consisting of cyanogen, cyanogen iodide, metal cyanides and alkali metal ferricyanides capable of releasing CN on being heated, and mixtures thereof, said CN group-containing compound being present in an amount, relative to the saturated aliphatic perfluorocarbon iodide, ranging from about stoichiometric to about a 39 percent excess over stoichiometric of CN group-containing compound;

and heating said mixture at a temperature in the range of 300 to 400° C., and at an autogenous pressure of at least 20 atmospheres thereby to cause reaction between the saturated aliphatic perfluorocarbon iodide and the CN group-containing compound.

11. The method of preparing a fluoronitrile which comprises: mixing a saturated aliphatic perfluorocarbon monoiodide having from one to six carbon atoms and having the iodine connected to the molecule in a primary position, with an amount of cyanogen in the range of about 25 to about 39 percent in excess of the stoichiometric amount;

and heating said mixture at a temperature in the range of 300 to 400° C. and at an autogenous pressure of at least 50 atmospheres thereby to cause reaction between the saturated aliphatic perfluorocarbon monoiodide and the cyanogen.

12. The method of preparing a fluoronitrile which comprises: mixing a saturated aliphatic perfluorocarbon monoiodide having from one to six carbon atoms and having the iodine connected to the molecule in a primary position, with an amount of cyanogen iodide in the range of about 25 to about 39 percent in excess of the stoichiometric amount;

and heating said mixture at a temperature in the range of 300 to 400° C., and at an autogenous pressure of at least 50 atmospheres thereby to cause reaction between the saturated aliphatic perfluorocarbon monoiodide and the cyanogen iodide.

References Cited by the Examiner

UNITED STATES PATENTS 2,939,878   6/1960   Ruh et al. _____ 260—465.7

OTHER REFERENCES

Muller (Houben-Weyl), "Methoden der organischen Chemie," volume v/4, 1960, Verlag-Stuttgart, page 685.

Paul et al., Chemical Abstracts, vol. 44, 1950, page 1013.

CHARLES B. PARKER, *Primary Examiner.*